United States Patent [19]

Leland et al.

[11] Patent Number: 4,482,668

[45] Date of Patent: Nov. 13, 1984

[54] POLY(ARYLENE SULFIDE) CONTAINING TALC

[75] Inventors: John E. Leland; Paul J. Boeke, both of Bartlesville, Okla.

[73] Assignee: Phillips Petroleum Company, Bartlesville, Okla.

[21] Appl. No.: 434,663

[22] Filed: Oct. 15, 1982

[51] Int. Cl.$^3$ ............................ C08K 3/34; C08K 3/10
[52] U.S. Cl. ...................................... 524/413; 524/451
[58] Field of Search ......................... 524/451, 413, 262

[56] References Cited

U.S. PATENT DOCUMENTS

| | | | |
|---|---|---|---|
| 3,157,614 | 11/1964 | Fischer | 524/451 |
| 3,622,376 | 11/1971 | Tieszen et al. | 428/419 |
| 3,622,537 | 11/1971 | Needham et al. | 524/305 |
| 3,894,983 | 7/1975 | Higbee | 524/451 |
| 3,929,708 | 12/1975 | Brady et al. | 524/267 |
| 4,134,874 | 1/1979 | Needham | 524/431 |
| 4,176,098 | 11/1979 | Needham | 524/174 |
| 4,247,598 | 1/1981 | Blackwell | 524/451 |
| 4,284,549 | 8/1981 | Salee | 524/262 |

FOREIGN PATENT DOCUMENTS 52-52958  4/1977  Japan ................................. 524/262

*Primary Examiner*—Lewis T. Jacobs

[57] ABSTRACT

An electrical insulation composition containing poly(arylene sulfide) and talc having a median particle size not exceeding about 4 microns.

30 Claims, No Drawings

POLY(ARYLENE SULFIDE) CONTAINING TALC

This invention relates to poly(arylene sulfide) compositions.

In one aspect this invention relates to electrical insulation materials and poly(arylene sulfide) compositions useful as such materials.

BACKGROUND

Carbonization of poly(arylene sulfide) electrical insulation materials can occur under the influence of high electrical potential. In application the surface of an insulator typically accumulates dusts, moisture, oils and so on. This accumulation of contaminants can create a conductive layer on the outer surface of the insulation material which, under the influence of sufficient potential drop, will "breakdown electrically" thus allowing the passage of current through the conductive layer and along the insulation surface. Heat, generated by the resistive dissipation of electrical energy as current passes through the conductive layer, causes decomposition or evaporation of the conductive medium. The passage of current, which may last for only a very short period of time, often exists in the form of an electrical arc across the surface of the insulator. The resultant high temperature along the current path promotes carbonization of carbonizable insulation material. This carbonization produces a carbon path which, if allowed to develop under the influence of successive surface tracking breakdown cycles, will ultimately produce a continuously conductive path which in turn will allow the continuous passage or leakage of current along the surface of poly(arylene sulfide) insulation material.

The resistance of an electrical insulation material to carbonization and the formation of conductive tracks can be measured by, for example, a Comparative Tracking Index test. The ASTM Test Method designated D 3638-77 and entitled "Comparative Tracking Index of Electrical Insulating Materials" describes the test in detail and is incorporated by reference herein. A description of the test can be found in the 1982 Annual Book of ASTM Standards, Part 39. The test is summarized therein as follows:

The surface of a specimen of electrical insulating material is subjected to a low-voltage alternating stress combined with a low which is dropped between two opposing electrodes every 30 s. The voltage applied across these electrodes is maintained until the current flow between them exceeds a predetermined value which constitutes failure. Additional specimens are tested at other voltages so that a relationship between applied voltage and number of drops to failure can be established through graphical means. The numerical value of the voltage which causes failure with the application of 50 drops of the electrolyte is arbitrarily called the comparative tracking index. This value provides an indication of the relative track resistance of the material.

The significance of the ASTM test is described, in part, as follows:

Electrical equipment may fail as a result of electrical tracking of insulating material that is exposed to various contaminating environments and surface conditions . . . . This method is an accelerated test which at relatively low test voltages, provides a comparison of the performance of insulating materials under wet and contaminated conditions . . . .

When organic electrical insulating materials are subjected to conduction currents between electrodes on their surfaces, many minute tree-like carbonaceous paths or tracks are developed near the electrodes. These tracks are oriented randomly, but generally propagate between the electrodes under the influence of the applied potential difference. Eventually a series of tracks spans the electrode gap, and failure occurs by shorting of the electrodes.

OBJECTS

It is an object of this invention to provide poly(arylene sulfide) compositions.

It is another object of this invention to provide electrical insulation compositions.

It is another object of this invention to improve the resistance of poly(arylene sulfide) compositions to carbonization and track formation.

These objects and other objects and advantages will be apparent from a study of this disclosure and the appended claims.

BRIEF SUMMARY OF THE INVENTION

In accordance with this invention the resistance of a poly(arylene sulfide) composition to carbonization and track formation is increased by adding the poly(arylene sulfide) a talc having a median particle size not exceeding about 4 microns. This invention, in its broad concept, is a composition including at least poly(arylene sulfide) and the above-defined talc.

This invention is further defined by, and other aspects of this invention are identified in, the disclosure which follows.

DETAILED DESCRIPTION OF THE INVENTION

This invention relates to poly(arylene sulfide) compositions. The term poly(arylene sulfide) is intended to designate arylene sulfide polymers. The scope of this invention broadly encompasses all such polymers.

Without being limited thereto, incured or partially cured poly(arylene sulfide) whether homopolymer, copolymer, terpolymer, and the like, or a blend of such polymers, can be used in the practice of this invention. The uncured or partially cured polymer is a polymer the molecular weight of which can be increased by either lengthening of a molecular chain or by crosslinking or by combination of both by supplying thereto sufficient energy, such as heat. Suitable poly(arylene sulfide) polymers include, but are not limited to, those described in U.S. Pat. No. 3,354,129, incorporated by reference herein. Examples of poly(arylene sulfide) polymers suitable for purposes of this invention include poly(2,4-tolylene sulfide), poly(4,4'-biphenylene sulfide) and poly(p-phenylene sulfide). Because of its availability and desirable properties (such as high chemical resistance, nonflammability, and high strength and hardness) poly(p-phenylene sulfide) is the presently preferred poly(arylene sulfide).

The mineral talc is a natural hydrous magnesium silicate designated by the chemical formula $Mg_3Si_4O_{10}(OH)_2$. It has a theoretical composition of about 31.7% MgO, 63.5% $SiO_2$ and 4.8% $H_2O$. A large number of mineral mixtures are sold as "talc". The mineral talc is usually, but not always, a major constituent of such "talc" mixtures.

Talc deposits of varying composition and physical characteristics can be found in a number of different geographical locations. For this reason talcs are commonly classified in accordance with their geographical source. Examples of such classifications include the following: Canadian talc, Italian talc, French talc, Montana talc, Alabama talc, Vermont talc, Texas talc, New York talc and California talc.

Talc occurs in a variety of forms. Examples of such forms include, but are not limited to, foliated, fibrous, massive and platy.

The talc within the scope of this invention is talc having a median particle size of less than about 4 microns and preferably less than about 2 microns. The smaller size is preferred because it facilitates better dispersion of the talc in the composition. In one embodiment of this invention the talc is a California talc. In another embodiment of this invention the talc is a platy talc, preferably a platy California talc. Talc satisfying the above criteria can be used to give poly(arylene sulfide) compositions increased resistance to carbonization and track formation as measured in accordance with the comparative tracking index (CTI) test previously described.

In this disclosure and in the clams the term particle size is intended to mean the equivalent spherical diameter of the particle. It should also be noted that a typical talc can have a wide particle size distribution associated with it. It is the median particle size (not the average particle size) that is used to define the talc of this invention. The median particle size is that size below which the sizes of half of the talc particles fall. The other half of the particles have sizes greater than the median particle size.

An example of a talc within the scope of this invention is the talc designated CP10-40 sold by the Minerals, Pigments and Metals Division of Pfizer Inc., New York, New York. This talc is a California talc characterized by a platy shape and a median particle size of about 1.9 microns. A typical composition (calculated as the oxides) is as follows:

|  |  | weight percent |
|---|---|---|
| silicon dioxide | ($SiO_2$) | 52.4% |
| magnesium oxide | (MgO) | 27.6% |
| calcium oxide | (CaO) | 6.2% |
| aluminum oxide | ($Al_2O_3$) | 1.4% |
| ferric oxide | ($Fe_2O_3$) | 0.3% |
| acid solubles as CaO—max |  | 9.0% |
| loss on ignition |  | 10.3% |

The composition given above in as provided by Pfizer.

The composition of this invention includes poly(arylene sulfide) and California talc as defined above. The composition can further include, if desired, fillers, reinforcements, processing aids, pigments, etc. Examples of fillers can be found in the Encyclopedia of Polymer Science and Technology, Volume 6, pages 740-762 and in the Kirk-Othmer Encyclopedia of Chemical Technology, 3rd Edition, Volume 10, pages 198-214. Examples of reinforcements can be found in the Encyclopedia of Polymer Science and Technology, Volume 12, pages 1-57. Processing aids (such as, for example, zinc stearate, $Li_2CO_3$, etc.), pigments and other additives are also well known in the art.

The resistance of the poly(arylene sulfide) composition to carbonization and track formation can be further improved by adding to the composition titanium dioxide or 3-mercaptopropyltrimethoxysilane or a combination of both. The combination of both is preferred since better CTI test results are obtained with compositions containing the combination.

In another embodiment of this invention glass fibers are added to the composition to give improved mechanical properties.

The poly(arylene sulfide) and talc of this invention and, as desired, any other components (e.g. fiber glass, silane, titanium oxide, fillers, reinforcements, processing aids, pigments, etc.) can be combined in any manner capable of producing a good mix. Persons of skill in the art are familiar with conventional mixing, blending or compounding methods and apparatus suitable to make the compositions of this invention. For more detailed information the reader is referred to the Kirk-Othmer Encyclopedia of Chemical Technology, 3rd Edition, Volume 15, pages 604 to 637 and to the Encyclopedia of Polymer Science and Technology, Volume 4, pages 118 to 128.

The essence of this invention broadly resides in the combination of poly(arylene sulfide) and talc (as defined above). The weight ratio of poly(arylene sulfide) to talc can range from very small to very large. It is desired that the talc be present in an amount sufficient to increase the resistance of the poly(arylene sulfide) composition to carbonization and track formation. In typical application the amount of talc will be about 40 to about 140 parts by weight per 100 parts by weight of poly(arylene sulfide), however, this invention is not limited thereto.

The following recommended ranges are presented to provide some guidance and to illustrate some of the compositions within the scope of this invention. The members given below represent the parts by weight of the corresponding component per 100 parts by weight of poly(arylene sulfide).

|  | Broad Range | Intermediate Range | Narrow Range |
|---|---|---|---|
| Poly(arylene sulfide) | 100 | 100 | 100 |
| Talc | 40–140 | 50–115 | 62–72 |
| Glass Fibers | 0–140 | 50–100 | 66–76 |
| Titanium dioxide | 0–70 | 20–50 | 31–41 |
| 3-mercaptopropyltrimethoxy-silane | 0–20 | 1–5 | 2–3 |

The poly(arylene sulfide) compositions of this invention are useful as electrical insulation materials. As embodiment of this invention is an electrical apparatus employing a poly(arylene sulfide) composition of this invention as an electrical insulation material. It is intended that the term electrical apparatus be interpreted very broadly.

The compositions of this invention are useful for purposes and applications other than electrical insulation. A wide variety of applications for poly(arylene sulfide) compositions in general is well known and the compositions of this invention can be employed in many of those applications.

The following examples were selected from presentation in this disclosure because of the good results obtained and because they provide a good illustration of certain embodiments of this invention.

EXAMPLES

The various compositions used in examples 1 and 2 were produced in batches ranging in weight from 10 to 20 lbs. Each composition was prepared by blending its components, except for glass, for about 3 minutes in a Henschel mixer at room temperature operating at about 1800 RPM. After this mixing period glass was added and mixing continued for about 30 additional seconds. Each mixture produced thereby was passed through a Buss-Condux compounding extruder (equipped with a standing die) at a melt temperature of about 310° C. The extruded strands were cooled and cut into pellets by a set of conventional revolving knives.

Test specimens of the various compositions were made by injection molding of the pellets at about 310° C. The test specimens were molded into the form of discs (about 2¼ inches diameter, about 60 mils thick) or rectangles (about 2 inches wide, about 3 inches long, about 100-120 mils thick).

Comparative tracking index (CTI) tests were conducted for each composition in accordance with ASTM Test Method D 3638 as described in the 1982 Annual Book of ASTM Standards Part 39. A Beckman Insulation Tracking Test Set, Model DT-1, having platinum electrodes was employed. Usually, depending upon the results, 5 test specimens of each composition were tested at the specified voltage. All compositions were tested at 250 V. Some compositions were additionally tested at 275 V and 300 V. The results are reported as the number of specimens that passed out of the total number of specimens tested. To pass a specimen must receive 50 drops of contaminant (electrolyte) without failure caused by tracking.

The poly(arylene sulfide) polymers employed in the examples were linear particulate poly(p-phenylene sulfide) polymers made in accordance with U.S. Pat. No. 3,354,129. The poly(p-phenylene sulfide) polymers are designated as PPS. The PPS polymers were precured to give a flow rate of about 22–30 g/10 min. as determined in accordance with ASTM Test Method D 1238 Procedure B modified to use a 600° F. temperature, a 1.270 Kg weight and an orifice having a 0.0825 inch diameter and a 1.25 inch length.

The talcs used in the compositions are described below:

Talc 1—Pioneer 2620 sold by Whittaker, Clark and Daniels, Inc. of South Plainfield, N.J. Particle size ranges from less than 1 micron to over 30 (but less than 44) microns. Median particle size is about 6.5 microns. Typical chemical composition (calculated as the oxides):

| silica | $SiO_2$ | 55–59 wt % |
| magnesium oxide | MgO | 31–34 wt % |
| calcium oxide | CaO | 1–2 wt % |
| aluminum oxide | $Al_2O_3$ | 0.4–0.8 wt % |
| ferric oxide | $Fe_2O_3$ | 0.2–0.5 wt % |
| sodium oxide | $Na_2O$ | less than 0.5 wt. % |
| potassium oxide | $K_2O$ | less than 0.5 wt. % |
| phosphorus pentoxide | $P_2O_5$ | less than 1 wt % |
| moisture | | less than 1 wt % |
| loss on ignition | | 6–10 wt % |
| pH | | 7–9.5 |

Talc 2—California CP10-40 sold by the Minerals, Pigments and Metals Division of Pfizer Inc., New York, N.Y. Particle size ranges from less than 1 micron to about 15 microns. Median particle size is about 1.9 microns. Typical chemical composition (calculated as the oxides):

| silica | $SiO_2$ | 52.4 wt % |
| magnesium oxide | MgO | 27.6 wt % |
| calcium oxide | CaO | 6.2 wt % |
| aluminum oxide | $Al_2O_3$ | 1.4 wt % |
| ferric oxide | $Fe_2O_3$ | 0.3 wt % |
| acid solubles as CaO—max | | 9.0 wt % |
| loss on ignition | | 10.3 wt % |

Talc 3—California CP75-20 sold by the Minerals, Pigments and Metals Division of Pfizer Inc., New York, N.Y. Particle size ranges from about 1 micron to about 75 microns. Median particle size is about 6.5 microns. Typical chemical composition (calculated as the oxides):
Substantially identical to CP10-40.

The above information with respect to talcs 1, 2 and 3 is as reported by the manufacturers. Particle size represents the equivalent spherical diameter in microns. In should be noted that although the typical chemical compositions are given on a free oxide basis the major talc constituents are mostly combined in a complex magnesium silicate.

Other components used in the compositions are briefly described below:

Titanium dioxide—Anatase, a natural crystallized form of titanium dioxide. Melting point of about 1560° C.
Mercaptosilane—3-mercaptopropyltrimethoxysilane marketed as A-189 by Union Carbide Corp., New York, N.Y.
Zinc stearate—Mold release agent. Commercially available through several companies.
Lithium carbonate—Mold corrosion agent. Commercially available through many companies.
Polyethylene—High density linear polyethylene (HPPE).
Glass fiber—Strands of 497 or 197 Owens Corning fiberglass chopped to give pieces about ⅛ inch in length.

EXAMPLE 1

The components of the compositions of this example and the CTI results corresponding to those compositions are set forth in Table 1. The components are given in parts by weight based upon 100 parts of total composition.

TABLE 1

| Composition | PPS | Glass | Talc 1 | Talc 2 | $TiO_2$ | $Li_2CO_3$ | Zinc Stearate | CTI(No. Passed/No. Tested) 250 V | 275 V | 300 V |
|---|---|---|---|---|---|---|---|---|---|---|
| 1 | 35 | 25 | 26.4 | — | 12.5 | 1.0 | 0.1 | 5/6 | 5/6 | ⅛ |
| 2 | 35 | 25 | — | 26.4 | 12.5 | 1.0 | 0.1 | 5/5 | 5/6 | 5/6 |

The CTI results show that composition 2 containing the California talc of this invention outperformed composition 1 containing the talc presently used by Phillips Chemical Company in commercially available PPS compositions.

EXAMPLE 2

The components of the compositions of this example and the CTI results corresponding to those compositions are set forth in Table 2. The components are given in parts by weight based upon 100 parts of total composition.

TABLE 2

| Composition | PPS | Glass | Talc 2 | Talc 3 | TiO₂ | Mercapto Silane | Li₂CO₃ | HDPE | CTI(No. Passed/No. Tested) 250 V | 275 V | 300 V |
| --- | --- | --- | --- | --- | --- | --- | --- | --- | --- | --- | --- |
| 3 | 35 | 25 | — | 37.9 | — | 0.8 | 1.0 | 0.3 | 0/4 | — | — |
| 4 | 35 | 25 | 37.9 | — | — | 0.8 | 1.0 | 0.2 | 5/6 | — | — |
| 5 | 33.4 | 23.8 | 28.9 | — | 11.9 | 0.8 | 1.0 | 0.3 | 5/5 | 5/5 | 5/5 |

The results show that composition 3 having the talc (talc 3) with the larger median particle size (about 6.5 microns) did not obtain results as good as those obtained by composition 4 having the talc (talc 2) with the smaller median particle size (about 1.9 microns).

A comparison of compositions 4 and 5 further demonstrates the utility of the titanium oxide/mercaptosilane combination. Composition 5 (with titanium oxide and mercaptosilane) obtained perfect results (i.e. 5/5) at 250 V, 275 V and 300 V. Composition 4 had only the mercaptosilane.

What is claimed is:

1. A composition comprising poly(arylene sulfide) and talc; wherein said talc has a median particle size not exceeding about 4 microns; and wherein the amount of talc in the composition is about 40 to about 140 parts by weight per 100 parts by weight of poly(arylene sulfide).

2. A composition in accordance with claim 1 wherein said talc is a California talc.

3. A composition in accordance with claim 1 wherein said talc is a platy talc.

4. A composition in accordance with claim 1 wherein said talc is a platy California talc.

5. A composition in accordance with claim 4 wherein said poly(arylene sulfide) is poly(p-phenylene sulfide).

6. A composition in accordance with claim 4 further comprising glass fibers.

7. A composition in accordance with claim 4 further comprising titanium dioxide.

8. A composition in accordance with claim 4 further comprising 3-mercaptopropyltrimethoxysilane.

9. A composition in accordance with claim 4 further comprising titanium dioxide and 3-mercaptopropyltrimethoxysilane.

10. A composition in accordance with claim 4 wherein said median particle size does not exceed about 2 microns.

11. A composition in accordance with claim 4 wherein the composition of said talc, calculated as the oxides, includes:
   about 52.4% silicon dioxide,
   about 27.6% magnesium oxide,
   about 6.2% calcium oxide,
   about 1.4% aluminum oxide, and
   about 0.3% ferric oxide;
wherein the above percentages represent weight percentages based upon the total weight of said talc.

12. A composition comprising poly(arylene sulfide) and talc; wherein said talc has a median particle size not exceeding about 4 microns; and wherein said talc is present in an amount sufficient to improve the resistance of the composition to carbonization and track formation.

13. A composition in accordance with claim 12 wherein said poly(arylene sulfide) is poly(p-phenylene sulfide).

14. A composition in accordance with claim 12 wherein said talc is a California talc.

15. A composition in accordance with claim 12 wherein said talc is a platy talc.

16. A composition in accordance with claim 12 wherein said talc is a platy California talc.

17. A composition comprising:
   (a) poly(p-phenylene sulfide),
   (b) 40–140 parts by weight of talc per 100 parts by weight of poly(p-phenylene sulfide),
   (c) 0–140 parts by weight of glass fibers per 100 parts by weight of poly(p-phenylene sulfide),
   (d) 0–70 parts by weight of titanium dioxide per 100 parts by weight of poly(p-phenylene sulfide), and
   (e) 0–20 parts by weight of 3-mercaptopropyltrimethoxysilane per 100 parts by weight of poly(p-phenylene sulfide);
wherein said talc is California talc characterized by a platy shape and a median particle size not exceeding 4 microns.

18. A composition comprising:
   (a) poly(p-phenylene sulfide),
   (b) 50–115 parts by weight of talc per 100 parts by weight of poly(p-phenylene sulfide),
   (c) 50–100 parts by weight of glass fibers per 100 parts by weight of poly(p-phenylene sulfide),
   (d) 20–50 parts by weight of titanium dioxide per 100 parts by weight of poly(p-phenylene sulfide), and
   (e) 1–5 parts by weight of 3-mercaptopropyltrimethoxysilane per 100 parts by weight of poly(phenylene sulfide); wherein said talc is California talc characterized by a platy shape and a median particle size not exceeding 4 microns.

19. A composition in accordance with claim 18 comprising 62–72 parts by weight of said talc, 66–76 parts by weight of said glass fibers, 31–41 parts by weight of said titanium dioxide, and 2–3 parts by weight of said 3-mercaptopropyltrimethoxysilane per 100 parts by weight of said poly(p-phenylene sulfide).

20. A composition in accordance with claim 18 wherein said median particle size does not exceed about 2 microns.

21. A method for increasing the resistance of a poly(arylene sulfide) composition to carbonization and track formation comprising combining poly(arylene sulfide) and talc; wherein the amount of talc in the composition is about 40 to about 140 parts by weight per 100 parts by weight of poly(arylene sulfide); and wherein said talc is a California talc having a platy grain shape and a median particle size not exceeding about 4 microns.

22. A method in accordance with claim 21 wherein said poly(arylene sulfide) is poly(p-phenylene sulfide); and
   wherein said median particle size does not exceed about 2 microns.

23. A method in accordance with claim 22 wherein said poly(p-phenylene sulfide) is also combined with titanium dioxide and 3-mercaptopropyltrimethoxysilane.

24. An electrical apparatus employing the composition of claim 1 as an electrical insulation material.

25. An electrical apparatus employing the composition of claim 4 as an electrical insulation material.

26. An electrical apparatus employing the composition of claim 16 as an electrical insulation material.

27. An electrical apparatus employing the composition of claim 5 as an electrical insulation material.

28. An electrical apparatus employing the composition of claim 18 as an electrical insulation material.

29. An electrical apparatus employing the composition of claim 19 as an electrical insulation material.

30. An electrical apparatus employing the composition of claim 11 as an electrical insulation material.

* * * * *